United States Patent
Malleshi et al.

(10) Patent No.: US 7,153,528 B2
(45) Date of Patent: Dec. 26, 2006

(54) PROCESS FOR PREPARATION OF HYPOGLYCEMIC FOODS AND FORMULATIONS THEREOF

(75) Inventors: Nagappa Gurusiddappa Malleshi, Karnataka (IN); Ushakumari Rambahadur Singh, Karnataka (IN); Syed Zakiuddin Ali, Karnataka (IN)

(73) Assignee: Council of Scientific & Industrial Research, New Delhi (IN)

( * ) Notice: Subject to any disclaimer, the term of this patent is extended or adjusted under 35 U.S.C. 154(b) by 672 days.

(21) Appl. No.: 10/400,933

(22) Filed: Mar. 28, 2003

(65) Prior Publication Data
US 2004/0191377 A1    Sep. 30, 2004

(51) Int. Cl.
*A61K 36/899* (2006.01)
*A61K 36/48* (2006.01)

(52) U.S. Cl. .................. 424/750; 424/757

(58) Field of Classification Search .......... None
See application file for complete search history.

(56) References Cited

U.S. PATENT DOCUMENTS 7,014,872 B1 *   3/2006   Pushpangadan et al. ..... 424/725
2003/0148016 A1 *   8/2003   Choudhry .................. 426/660

* cited by examiner

*Primary Examiner*—Christopher R. Tate
*Assistant Examiner*—Melenie McCormick
(74) *Attorney, Agent, or Firm*—Arent Fox PLLC

(57) ABSTRACT

The process for preparation of hypoglycemic foods and formulations thereof, useful as snacks, wholesome or supplementary foods, especially to the Type II diabetics, and a hypoglycemic foods and formulations product of composition with concentration of toasted cereals is ranging between 50–60%, concentration of toasted legumes is ranging between 6–12%, concentration of soy is ranging between 7–15%, concentration of fenugreek is ranging between 2–6%, concentration of spice mix is ranging between 3–7%, concentration of amla fruit pulp is ranging between 0.5–2%, concentration of *Garcinia combogia* rinds is ranging between 1.5 to 3%, concentration of dry skimmed milk is ranging between 3–6%, concentration of edible oil is ranging between 2–6%, and concentration of vitamin and mineral premix is ranging between 1–3%.

15 Claims, 1 Drawing Sheet

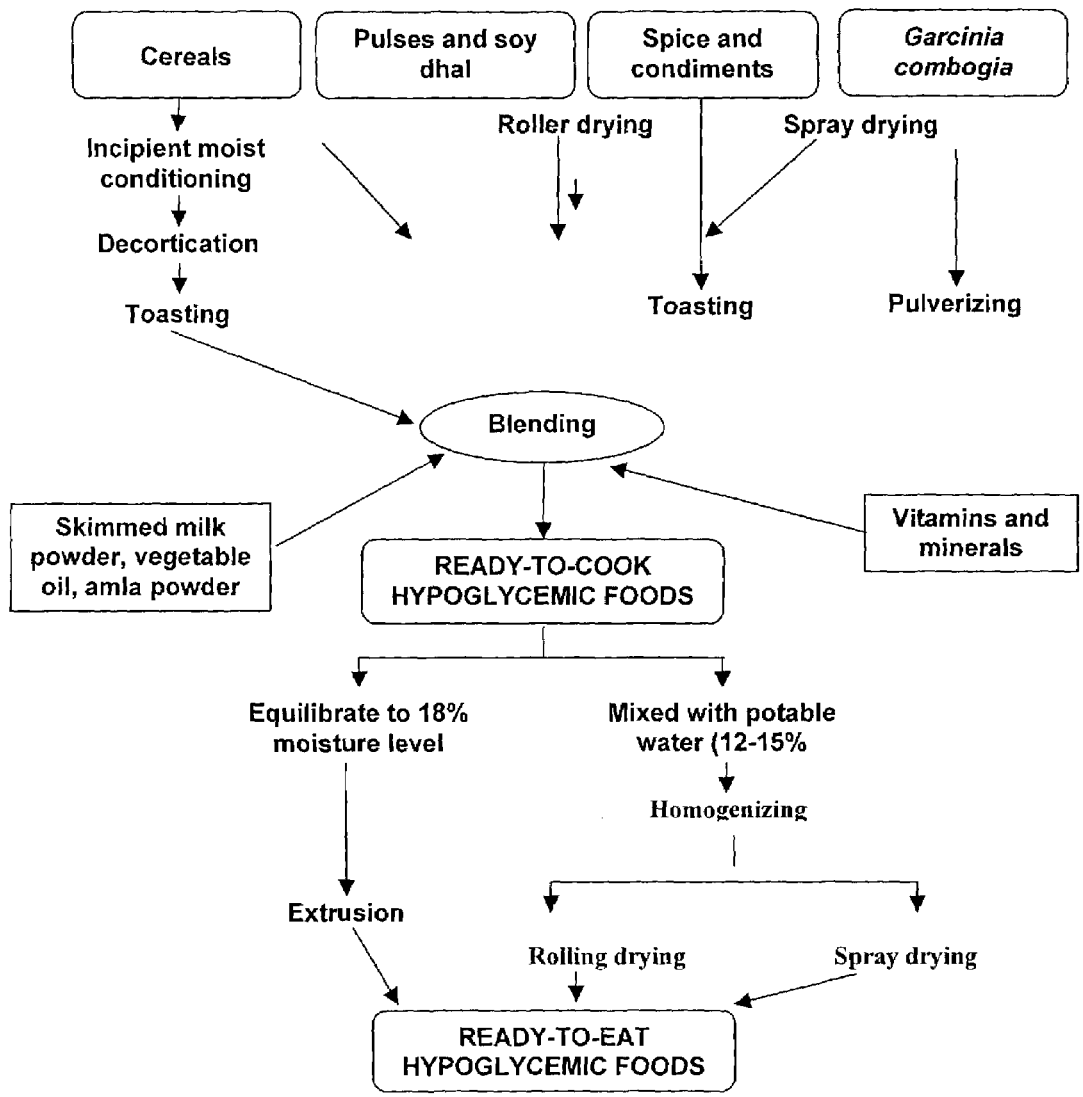
Figure 1. The flow chart followed preparation of ready-to-cook and ready-to-eat hypoglycemic foods

PROCESS FOR PREPARATION OF HYPOGLYCEMIC FOODS AND FORMULATIONS THEREOF

FIELD OF THE PRESENT INVENTION

A process for preparation of hypoglycemic foods and formulations thereof, useful as snacks, wholesome or supplementary foods, especially to the Type II diabetics, and a hypoglycemic foods and formulations product of composition with concentration of toasted cereals is ranging between 50–60%, concentration of toasted legumes is ranging between 6–12%, concentration of soy is ranging between 7–15%, concentration of fenugreek is ranging between 2–6%, concentration of spice mix is ranging between 3–7%, concentration of amla fruit pulp is ranging between 0.5–2%, concentration of Garcinia combogia rinds is ranging between 1.5 to 3%, concentration of dry skimmed milk is ranging between 3–6%, concentration of edible oil is ranging between 2–6%, and concentration of vitamin and mineral premix is ranging between 1–3%.

BACKGROUND AND PRIOR ART REFERENCES OF THE PRESENT INVENTION

The available carbohydrates of any food, namely sugars, dextrins and starch undergo digestion and absorption mainly in the form of glucose in human gastrointestinal tract which subsequently enters the blood stream. In response to glucose assimilation in the blood, the pancreas releases insulin and helps in metabolizing glucose. This results in maintaining proper level of glucose in blood in a specified range. In healthy humans, the insulin response is adequate to maintain blood glucose levels in normal limits but any aberration in the insulin response results in excess (hyperglycemia) or low (hypoglycemia) glucose levels in blood. Prolonged state of hyperglycemia leads to Type II (non-insulin dependent) diabetes, demanding regular intake of hypoglycemic medicines, and if not managed properly, the condition leads to Type I (insulin dependent) diabetes. This physiological disorder also occurs due to the destruction and malfunctioning of pancreatic beta cells or inadequate insulin secretion or secretion of ineffective insulin.

The prevalence of hyperglycemia or Type II diabetes is increasing alarmingly worldwide. In India about 5% of the population in general, and about 8% over 40 years, suffer from Type II diabetes. Diabetes mellitus, a physio-pathological disorder and is rarely curable but is manageable through medicines and diet, backed by regular exercise. However, management of diabetes through diet is very much practical, effective and remunerative. Because many of the complications associated with hyperglycemia such as accelerated ageing, ketoacidosis, atherosclerosis, nephropathy, neuropathy, retinopathy and delayed wound healing could be regulated by proper management of blood sugar. Realizing the important role of dietary management in Type II diabetes, the physicians, dieticians and 'diabetes care centers' are paying greater attention towards diets of the diabetics. In this regards, the scientific studies emphasize on foods containing slow digesting or complex carbohydrates, adequacy of dietary fiber, phytochemicals, antioxidants and micro-nutrients which exert blood glucose attenuation or of hypoglycemic properties. Such foods are not only beneficial in regulating the blood glucose response of the Type II diabetes, but also will be useful to healthy population in minimizing the risk of diabetes. The diets rich in complex carbohydrates, moderate levels of fat rich in PUFA, and also containing appropriate levels of essential micro-nutrients reported to be beneficial in regulating the blood glucose response in Type II diabetes for which reference may be made to D. J. A. Jenkins and co-workers (Metabolic effects of a low-glycemic index diet. American Journal of Clinical Nutrition, vol. 46, 968–75, 1987). Reference may also be made to G. Frost and A. Dornhorst (The relevance of the glycemic index to our understanding of dietary carbohydrates. Diabetic Medicine, vol. 17, 336–345, 2000), where in, low glycemic food ingredients are recommended to Type II diabetes, as hypoglycemic foods slowly release the glucose without causing spikes in blood sugar and thus preventing the risk involved with hyperglycemia.

Accordingly, fiber rich cereals such as whole wheat, low polish rice or brown rice, millets, grain legumes and leafy vegetables are suitable dietary components for diabetics (Simin L., Intake of refined carbohydrates and whole grain foods in relation to risk of Type II diabetes mellitus and coronary heart disease. Journal of American College of Nutrition, vol. 21, 298–306, 2002). Madar Z., Abel R., Samish S. and Arad J. (Glucose lowering effect of fenugreek in non-insulin dependent diabetics. European Journal of Clinical Nutrition, vol. 42, 51–54, 1988) reported that fenugreek (*Trigonella foenum graecum*) in the native form or on processing (germinated, boiled, toasted) exerts beneficial effects in regulating the blood glucose response.

Fenugreek provides twin advantages, namely, it stimulates b-cells to release the insulin response to glucose assimilation in the blood, and serves as a source of soluble dietary fibre mainly in the form of galactomannan, with galactose to mannose in 1:1 ratio, which is highly beneficial with respect to its physiological action in the GI tract. In recent years, the role of micro-nutrients such as chromium, selenium and zinc in acting synergetic to the hypoglycemic foods towards regulating the blood glucose in Type II diabetes has been well recognized (Anderson, et al., Elevated index of supplemental chromium improves glucose and insulin variables in individuals with Type II diabetes. Diabetes, vol. 46, 1786–91, 1997). Incorporation of amla (*Phyllanthus emblica*) and kokum (*Garcinia combogia*) as minor components of diets for diabetes, not only provide vitamin C, hydroxyl citric acid (HCA) and dietary fiber, but also phytochemicals with nutraceuticals with hypoglycemic properties (Clouatre D. and Rosenbaum M. The diet and health benefits of HCA. Keats Publishing, Inc. Connecticut, 1994). On the other hand incorporation of spices in proper proportion will contribute the natural antioxidants which also regulate the growth of pathogenic microflora in the gut.

A variety of foods, food supplements, herbal formulations, non-nutritive sweeteners and foods containing artificial sweeteners are marketed as diabetic foods in the country (Table 1) and also abroad. The draw backs of the hitherto known diabetic foods available as proprietary products to the consumers are that, most of them do not provide authentic information about the nature and processing the ingredients have undergone. Moreover, the energy derived from carbohydrates, proteins and fat, from the proprietary diabetic foods very often does not fall in the range normally recommended for the diabetics. Another draw back of the diabetic foods supplements is that, the information on their clinical safety specifically on their hypoglycemic indices are not indicated on the unit packs and also as part of food labels.

Hence, prolonged usage of such foods by the population at risk and the diabetics may aggravate health complications. Another drawback of the hitherto known diabetic formulations is that, most of them contain synthetic or non-nutritive sweeteners, and their prolonged usage may manifest in malignancy and may also lead to dysfunction of vital organs (Ralph G., Walton, Hudak R. and Ruth Green-Waite, Adverse reactions to Aspartame: Double blind challenge in patients from a vulnerable population. Biological Psychiatry, vol. 34, 13–17; 1993; Dennis Remington and Barbara Higa R. D., The bitter truth about artificial sweeteners. Aspartame Consumer Safety Network, Texas, 1987). Moreover, the formulations marketed as 'foods for diabetics' and not as hypoglycemic foods and hence, may cause an adverse socio-psychological effects on diabetics, and the population with impaired glucose tolerance or who are prone to diabetes may not use them.

Besides, many of them are herbal based products serving as source of phytochemicals and do not contribute carbohydrate energy and they may contain anti-nutrients and toxicants, which may cause health hazards to the consumer in the long run. To the best of our knowledge, no hypoglycemic food that is ready-to-eat or require minimum processing for consumption, that too in convenience form by the diabetics, especially in their workplace or during traveling, are marketed in the country. In view of this, there is a need to develop a process for preparation of hypoglycemic foods, suitable as total foods, food supplement and meal replacer for the Type II diabetics specifically, and which could also serve as normal diet for the healthy population. Hence, it was felt desirable to develop foods based on known and commonly available hypoglycemic food ingredients, and also containing protective as well as therapeutic nutrients such as dietary fiber, blood sugar regulators and micronutrients, suitably to provide as total nutritional support or as food supplement to diabetics and that too at price affordable by the needy, including consumers belonging to low income group.

OBJECTS OF THE PRESENT INVENTION

Therefore, the main objective of the present invention is to develop a process the indigenous food ingredients to improve their textural and sensory qualities without affecting their nutritional characteristics.

Another object of the present invention is to incorporate traditionally known hypoglycemic ingredients preferably from natural source.

Yet another object of the present invention is to provide a process for preparation of hypoglycemic food formulations in convenience form so that, recipes of individual choice could be prepared from that, or could be processed further to prepare ready-to-eat snacks/food supplement or meal replacers but still retain their hypoglycemic characteristics.

Still another object of the present invention is to develop a hypoglycemic food formulation or product.

Still another object of the present invention is to develop a food formulation of hypoglycemic and hypocholestrolic properties.

SUMMARY OF THE PRESENT INVENTION

A process for preparation of hypoglycemic foods and formulations thereof, useful as snacks, wholesome or supplementary foods, especially to the Type II diabetics, and a hypoglycemic foods and formulations product of composition with concentration of toasted cereals is ranging between 50–60%, concentration of toasted legumes is ranging between 6–12%, concentration of soy is ranging between 7–15%, concentration of fenugreek is ranging between 2–6%, concentration of spice mix is ranging between 3–7%, concentration of amla fruit pulp is ranging between 0.5–2%, concentration of *Garcinia combogia* rinds is ranging between 1.5 to 3%, concentration of dry skimmed milk is ranging between 3–6%, concentration of edible oil is ranging between 2–6%, and concentration of vitamin and mineral premix is ranging between 1–3%.

TABLE 1

Some of the diabetic foods marketed in India

| Product name | Resource Diabetic | Diafood | Nutrocal-DM | D-Protein | Diabetic's special | Ziprovit-D |
|---|---|---|---|---|---|---|
| Company name | Novartis Consumer Health India Limited, Mumbai | Saga Food Products Pvt. Ltd., Chennai | Wockhardt Life Sciences Ltd, Lalru, Punjab | British Biologicals, Bangalore | Yashaswini Food Products, Mysore | Mehcec Labs, Bangalore |
| Main ingredients | Hydrolyzed corn starch, vegetable oil, sodium caseinate, fructose, calcium caseinate, soy fiber, soy protein isolate, cocoa powder | Sprouted ragi, wheat, roasted bengal gram, soybean, green gram, black gram and fenugreek | Maltodextrin, whey protein, vegetable oil, sucrose, cellulose, soy fiber, gum acacia, soy lecithin | Protein isolate, skimmed milk powder, maltodextrin, malt, coca | Ragi, wheat, bengal gram, green gram and methi | Dry fruits, milk solids, prediges ted cereals extract and cocoa powder |
| Form | Powder | Powder | Powder | Powder | Powder | Powder |
| Protein (g%) | 26.8 (24%) | 12.0 (13.7%) | 20 (16.9%) | 28.0 (86.2%) | Not given | 30.0 (62.5%) |
| Carbohydrates (g%) | 41.8 (37.4%) | 65.0 (74.3%) | 47.2 (3.1%) | — | Not given | — |
| Fat (g%) | 19.8 (40%) | 3.0 (7.7%) | 22.6 (39.9%) | 2.0 (13.8%) | Not given | 8.0 (37.5%) |
| Fiber (g%) | 5.4 | 14.0 | 6.4 | — | Not given | 10.0 |

Note:
Values in parenthesis indicate the percentage energy derived from each of the nutrients

DETAILED DESCRIPTION OF THE PRESENT INVENTION

Accordingly, a process for preparation of hypoglycemic foods and formulations thereof, useful as snacks, wholesome or supplementary foods, especially to the Type II diabetics, and a hypoglycemic foods and formulations product of composition with concentration of toasted cereals is ranging between 50–60%, concentration of toasted legumes is ranging between 6–12%, concentration of soy is ranging between 7–15%, concentration of fenugreek is ranging between 2–6%, concentration of spice mix is ranging between 3–7%, concentration of amla fruit pulp is ranging between 0.5–2%, concentration of *Garcinia combogia* rinds is ranging between 1.5 to 3%, concentration of dry skimmed milk is ranging between 3–6%, concentration of edible oil is ranging between 2–6%, and concentration of vitamin and mineral premix is ranging between 1–3%.

In an embodiment of the present invention, wherein a process for preparation of hypoglycemic foods and formulations thereof, useful as snacks, wholesome or supplementary foods, especially to the Type II diabetics, said process comprises steps of:

spraying about 2–6% additional water into cereals,
tempering or resting the sprayed cereals for time duration ranging between 5–15 min,
scouring or decortication the tempered or rested to about 2–4% degree of decortication,
toasting the decorticated cereals optionally along with legumes, soy dhal, spice and condiments individually by contact heat at about 60–80° C. for time duration ranging between 10–30 min to obtain cereals with golden brown color, condiments, lending the toasted cereals optionally along with legumes, soy dhal, spices, and fenugreek seeds to obtain hypoglycemic blend,
pulverizing dried *Garcinia combogia* rinds along with hypoglycemic blend into grits of about 350 microns or lesser particle size to obtain pulverized mixture, blending the pulverized mixture with skimmed milk powder, vegetable oil, amla powder to obtain blended product,
fortification of blended product with vitamin and mineral premix to obtain fortified product, p1 homogenizing the fortified product with conventional food material to obtain hypoglycemic foods and formulations thereof, useful as snacks, wholesome or supplementary foods, especially to the Type II diabetics.

In still another embodiment of the present invention, wherein scouring of cereals helps separate the outermost layer of the seed coat.

In still another embodiment of the present invention, wherein toasting of the scored cereals help develops aroma.

In still another embodiment of the present invention, wherein the formulations shows concentration of carbohydrates ranging between 50–60 g %, protein of concentration ranging between 12–17 g %, lipids of concentration ranging between 4–9 g %, dietary fiber, vitamins, and minerals of concentration ranging between 12–20 g %.

In still another embodiment of the present invention, wherein the ready-to-cook formulation could be further processed by extrusion cooking, roller drying, spray drying or by such other means to prepare ready-to-eat products that serve as convenience foods to the healthy as well as diabetics.

In still another embodiment of the present invention, wherein concentration of toasted cereals is ranging between 50–60%, concentration of toasted legumes is ranging between 6–12%, concentration of soy is ranging between 7–15%, concentration of fenugreek is ranging between 2–6%, concentration of spice mix is ranging between 3–7%, concentration of amla fruit pulp is ranging between 0.5–2%, concentration of *Garcinia combogia* rinds is ranging between 1.5 to 3%, concentration of dry skimmed milk is ranging between 3–6%, concentration of edible oil is ranging between 2–6%, and concentration of vitamin and mineral premix is ranging between 1–3%.

In still another embodiment of the present invention, wherein the formulation retains its hypoglycemic characteristics when consumed with normal food adjuncts.

In still another embodiment of the present invention, wherein the ready-to-eat extruded food could be prepared in the form of grits, flakes, rolls, sticks, whereas the roller dried and spray dried foods could be granulated, and such products could be coated with edible fruit and vegetable powders, flavors and such other quality improvers to enhance their sensory qualities without affecting the blood glucose attenuation characteristics.

In still another embodiment of the present invention, wherein a process for preparation of foods with hypoglycemic characteristics useful as a wholesome food or food supplements especially for diabetics, substantially as here in described with reference to the examples.

In still another embodiment of the present invention, wherein the cereals are decorticated using cereal scourer, or rice huller, or grain pearler.

In still another embodiment of the present invention, wherein toasting is in a grain roaster, or hot air cereal dryer, or any other food toasting equipment or machinery including IR heater.

In still another embodiment of the present invention, wherein premix along with pulverizer product, with the hypoglycemic blend, wheat or other legumes as carrier, in such a proportion, that, 100 g of the food containing 1–3 g of the premix, meets 100% of their requirements as per recommended dietary allowance, In still another embodiment of the present invention, wherein pulverizing in a hammer mill or such other type cereal mills.

In still another embodiment of the present invention, wherein the premix comprises pharmaceutical grade vitamins A, D, B1, B2, B6, B12, B6, C, E, and minerals comprising chromium, selenium, zinc, biotin, pantothenenic, calcium, magnesium, iron, manganese, and copper.

In still another embodiment of the present invention, wherein equilibrating the ready-to-cook formulations to 14–20% moisture levels, and extruding in a single or twin screw extrusion cooker maintained at 150–200 rpm and 120–150° C. temperature or alternately mixing the ready-to-cook formulations with potable water with 10–15% (w/v) solid content, heating to boiling, homogenizing and roller drying or spray drying the slurry.

In still another embodiment of the present invention, wherein the ready-to-cook and ready-to-eat foods exhibit moderate blood glucose response with 55–75 glycemic index values irrespective of the method of cooking and form of consumption, against white breads as standard with GI value 100 and could be labeled as hypoglycemic foods.

In still another embodiment of the present invention, wherein the ready-to-cook formulations permits to prepare a wide range of conventional foods to meet the taste and palate of the populations of different regions and age group and yet retain their hypoglycemic characteristics.

In still another embodiment of the present invention, wherein a hypoglycemic foods and formulation product.

In still another embodiment of the present invention, wherein hypoglycemic foods and formulations product of composition with concentration of toasted cereals is ranging between 50–60%, concentration of toasted legumes is ranging between 6–12%, concentration of soy is ranging between 7–15%, concentration of fenugreek is ranging between 2–6%, concentration of spice mix is ranging between 3–7%, concentration of amla fruit pulp is ranging between 0.5–2%, concentration of *Garcinia combogia* rinds is ranging between 1.5 to 3%, concentration of dry skimmed milk is ranging between 3–6%, concentration of edible oil is ranging between 2–6%, and concentration of vitamin and mineral premix is ranging between 1–3%.

In still another embodiment of the present invention, wherein the said food shows moisture level of 12–18%.

In still another embodiment of the present invention, wherein the food is in both ready-to-cook and ready-to-eat forms.

In still another embodiment of the present invention, wherein the said food shows flexible composition of cereals, and dietary fibers, and legumes.

In still another embodiment of the present invention, wherein formulations shows concentration of carbohydrates ranging between 50–60 g %, protein of concentration raging between 12–17 g %, lipids of concentration ranging between 4–9 g %, dietary fiber, vitamins, and minerals of concentration ranging between 12–20 g %.

In still another embodiment of the present invention, wherein the spice and condiments are the source of soluble fiber with ratio of galactose and mannose of about 1:1.

In still another embodiment of the present invention, wherein the spice mix enhances sensory attributes.

In still another embodiment of the present invention, wherein constituents of the food synergizes each other to provide soluble and insoluble fiber in desirable ratio.

In still another embodiment of the present invention, wherein the food is non-toxic and nutritious.

In still another embodiment of the present invention, wherein the food shows pre- and pro-biotics, anti-carcinogenic, immunogenic, and anti-obese characteristics.

In still another embodiment of the present invention, wherein the hypoglycemic activity is contributed by amla and fenugreek.

The present invention relates to a process for preparation of hypoglycemic foods and a formulation thereof, especially useful as total or food supplement for Type II or non-insulin dependent diabetics.

Accordingly, the present invention provides a process for preparation of hypoglycemic foods and a formulation thereof, more suitable to Type II diabetics as total or as food supplement, which comprises of:
a. Scouring of wheat, sorghum and millets or such other cereals to detach and separate the outermost coarse layer of the seed coat, by known methods,
b. Toasting the scoured wheat and other cereals, pulses, dehusked and split soy and some of the spice and condiments in a grain roaster or such other equipment, preferably by contact heat till desirable aroma develops,
c. Mixing the toasted ingredients in suitable proportion to form the blend, that provides 12–14% protein and 14–19% dietary fiber and the energy in the ratio suggested for diabetics from protein, fat and carbohydrates, and pulverizing the blend in plate grinder, hammer mill or any other size reduction machinery, to grits of particle size less than 1.0 mm,
d. Pulverizing *Garcinia combogia* rinds along with a portion of the powdered blend prepared by milling the toasted cereal, pulses, soy, spice and condiments, to grits of particle size less than 350 microns,
e. Mixing skimmed milk powder, edible oil, turmeric powder, asafetida powder, amla powder and vitamins and minerals with the blend for preparation of a ready-to-cook convenience hypoglycemic food, and
f. Extrusion cooking, roller drying or spray drying the ready-to-cook formulation prepared as per 'e' to prepare ready-to-eat foods especially suitable for Type II diabetics.

In an embodiment of present invention, cleaned wheat, sorghum and millets may be sprayed with 2–6% (volume/weight) additional water, mixed thoroughly, tempered (rested) for 5–15 min and scoured or decorticated in a cereal scourer, rice huller or grain pearler to 2–4% degree of decortication.

In another embodiment of present invention, the decorticated cereals, decorticated and split legumes and soy are toasted individually by contact heat in grain roaster or mechanical dryers and such other equipment, heated by electricity, gas or steam or such other sources of heat transfer, grain process for 15–30 min at 60–80° C.

In yet another embodiment of the present invention, a premix containing food or pharmaceutical grade vitamins and minerals, including minerals of special significance to diabetes such as chromium and zinc, using the hypoglycemic blend or any of the cereal flours as filler, may be prepared so that, 1–3 g of the mix in 100 g of the food meets 100% requirements of vitamins and minerals as per recommended dietary allowance.

In yet another embodiment of the present invention, 1–3 g dried *Garcinia combogia* rinds are mixed with 10–15 g of the hypoglycemic blend or any of the cereal flours and pulverized to grits of 350 microns or lesser particle size in any of the pulverizers.

In yet another embodiment of present invention, 50–60% of the scoured and toasted wheat, or other cereals including millets 6–12% legumes, 7–15% soy, 2–6% fenugreek and 3–7% spice and condiments are pulverized together in a suitable pulverizer and blended with 0.5–2% amla fruit pulp powder, 2–5% *Garcinia combogia* mix, 3–6% non-fat dry milk, 3–6% edible oil rich in poly-unsaturated fatty acids and fortified the with 1–3% vitamins and minerals premix, to prepare ready-to-cook hypoglycemic and food.

In still another embodiment of the present invention, the food thus prepared could be cooked in the form of thick or thin porridge, upma, chapathi, dosa and also such other recipes in the form and manner desired by the consumers including Type II diabetics.

In still another embodiment of present invention, ready-to-cook food may be equilibrated to 12–18% moisture content by appropriate methods and the same may be extrusion cooked in a single or twin screw food extruder, working at 150–200 barrel rpm and 120–150° C. barrel temperature to prepare ready-to-eat food in the form of rolls, flakes, grits or in any desired size and shape.

BRIEF DESCRIPTION OF THE ACCOMPANYING DRAWINGS

FIG. 1 shows flow chart followed preparation of ready-to-cook and ready-to-eat hypoglycemic foods.

In still another embodiment of the present invention, the aqueous slurry (10–15% w/v) of the ready-to-cook food is heated to boiling, homogenized and dried over single or twin rolls of a rotary drier or spray dryer to prepare ready-to-eat foods more suitable for use in the form of porridge, soup or paste.

In yet another embodiment of the present investigation, the ready-to-eat hypoglycemic foods could serve as snacks, food supplements, meal replacer as such or in combination with conventional non-sugar adjuncts.

Although, the invention is described in detail with reference to specific embodiments thereof, it will be understood that, the variations, which are functionally equivalent are within the scope of this invention. Indeed, various modifications of the invention, in addition to those shown and described there in, will become apparent to those skilled in the art from the pre-going description. Such modifications also are intended to fall within the scope of the invention and appended claims.

The novel features of the process are that, it permits utilization of a wide range of cereals namely, wheat, sorghum, millets, rice, barley, oats, and also pseudo-cereals such as grain amaranthus to provide major proportion of dietary carbohydrates and also dietary fiber, and various grain legumes namely, chickpea, pigeon pea, green gram, black gram and such other pulses which serve as source of lysine rich protein foods. The legume proteins compliment well with cereal proteins to form nutritionally balanced foods. The soy serves as a source of protein, non-starch polysaccharides, and also provides oil rich in ω-6 fatty acids.

The spice and condiments especially, fenugreek contribute galactomannan considered to be an ideal source of soluble fiber with 1:1 galactose to mannose ratio, that exerts hypoglycemic and hypocholesterolemic characteristics and also 4-hydroxyisoleucine, an amino acid that stimulates secretion of insulin by b-cells of the pancreas. The spice mix, not only supplement to the fiber and micro-nutrient contents of the food but also enhances the sensory attributes besides regulating the pathogenic microflora of the gastrointestinal tract. Incorporation of vegetable oil containing desirable proportion of mono- and poly-unsaturated fatty acids stimulates normal integrity and functioning of cell membranes, besides providing lipid calories.

Another novel feature of the process is that, the cereals, legumes, spice and condiments not only enrich the food with many of the phytochemicals with nutraceutical qualities and micro-nutrients, but also synergize each other to provide soluble and insoluble fiber in a desirable ratio. The special feature of the product prepared as per the process described earlier provides all the nutrients that are essential for normal growth and maintenance of body functions of the Type II diabetics and also the healthy persons. The food derives about 60% energy from carbohydrates, 15% from protein and 25% from lipids which fall in line with recommendation of the National and International advisory bodies for diabetics.

Since, all the ingredients fall in the category of natural foods and are processed following well established food processing methodologies, formation of toxicants or anti-nutrients during processing is largely ruled out, on the other hand, the ingredients would have synergistic nutritional and health benefits. The greatest advantage of the process is that, it has flexibility with respect to selection and processing of the ingredients, utilization of the foods in the form of specific recipes to suit different palates and also in convenience ready-to-eat form, such as snacks, meal replacer and food supplements, as and when required including during travel, at work place and also could be served as breakfast, lunch or supper or any time of the day as per the choice of the individuals. However, it is advisable to take at least 100 g of food to derive the health benefits. Since, the ingredients are readily available throughout the country and at all seasons, and extrusion cooking, roller drying or spray drying facilities exist in almost all parts of the Nation, the facilities for preparation of ready-to-cook or ready-to-eat hypoglycemic foods may not be a difficult proposition.

The novelty of the process lies in its simplicity, adaptability from home to industrial scale and suitability of the foods for normal healthy as well as for Type I and II diabetics. Since, some of the ingredients of the food are traditionally known for their pre- and pro-biotics, anti-carcinogenic, immunogenic and anti-obese characteristics and hence, may provide other health beneficial qualities besides hypoglycemic characteristics. Moreover, the diabetics would accept the food without any inhibitions, because of the proven anti-diabetic characteristics of the traditionally familiar hypoglycemic ingredients such as fenugreek and amla. Processing of the ingredients being eco-friendly, it does not involve any chemical or health hazardous treatments and does not create effluents or environmental problems.

The following examples are given by way of illustration of the invention and therefore should not be construed to limit the scope of the present invention.

EXAMPLE 1

Fifty kg wheat was sprayed with 1.5 L potable water, tempered for 10 min and scoured to 2.5% degree of decortication in a rice huller. The scoured wheat was toasted in a grain roaster at 70° C. till the grains changed to golden brown color. Two kg bengal gram dhal, 1.5 kg black gram dhal, 1.5 kg green gram dhal, 6 kg dehusked soy dhal and 3 kg fenugreek seeds, 1 kg pepper, 1 kg cumin seeds and 0.2 kg cinnamon, each toasted separately in a grain roaster by contact heat at about 80° C. till the development of characteristic desirable aroma from each of the ingredients. Subsequently, out of these toasted material, 30 kg wheat, 1.5 kg bengal gram dhal, 1 kg black gram dhal, 1 kg green gram dhal, 5 kg soy dhal, 2.5 kg fenugreek seeds, 0.75 kg pepper, 0.5 kg cumin seeds and 0.15 kg cinnamon were mixed well, and to that 1 kg dry *Garcinia combogia* rinds was added and the blend was pulverized in a plate mill to the meal of the particle less than 350 micron size.

To the pulverized mixture, 0.05 kg asafoetida powder, 0.15 kg turmeric powder, 0.5 kg amla pulp powder, 2.5 kg skimmed milk powder, 1.25 kg table salt and 2 kg vegetable oil (saffola brand) were added and blended well. To this, 1.0 kg of vitamin and mineral pre-mix prepared by mixing 50,00,000 IU vitamin A (as acetate), 5,00,000 IU vitamin D (as cholecalciferol) 5.0 g vitamin $B_1$ (as thiamine mononitrate), 5 g vitamin $B_2$ (riboflavin), 1.5 g vitamin $B_6$ (as pyridoxine hydrochloride), 7.5 mg vitamin $B_{12}$ (cyanocobalamin), 50 g vitamin $B_3$ (nicotinamide), 75 g vitamin C (ascorbic acid), 12.5 g vitamin E (as alpha-tocopheryl acetate), 125 mg biotin and 8.15 g pantothenenic acid (as calcium pantothnate), and 64.5 g calcium (as calcium phosphate), 30 g magnesium (as magnesium oxide), 16.0 g iron (as ferrous sulphate), 1.02 g manganese (as magnesium sulphate), 1.7 g copper (as copper sulphate), 1.1 g zinc (as zinc sulphate), 12.5 mg chromium (as picolinate) added to 1 kg of the blend and mixed well and homogenized with the food.

The food thus prepared contained 14.5% protein, 7.9% fat, 55.6% available carbohydrates and 18.2% dietary fibre and 100 g of the food contained essential vitamins and minerals, sufficient to meet their daily requirements by the adults (Table 2). The food (ready-to-cook, RTC) was found suitable for preparation of various conventional products, such as chapathi, idli, upma, dosa and pongal The texture and mouth feel of the products was comparable to that prepared from conventional ingredients. The food products were acceptable by all sections of population including Type I and Type II diabetics, although, residual bitterness was persistent, mainly contributed by the fenugreek content of the food.

EXAMPLE 2

Fifty kg decorticated finger millet prepared following the process developed by CFTRI, Mysore (Malleshi, N. G., A process for preparation of decorticated finger millet. Indian Patent Application No. 69/DEL/2002, 2002), was toasted at 50° C. in a gram roaster. Two kg bengal gram dhal, 1.5 kg black gram dhal, 1.5 kg green gram dhal, 6 kg dehusked soy dhal and 3 kg fenugreek seeds, 1 kg pepper, 1 kg cumin seeds and 0.2 kg cinnamon, each toasted separately in a grain roaster by contact heat at about 80° C. till the characteristic desirable aroma from each of the ingredients developed.

Subsequently, out of these toasted material, 30 kg wheat, 1.5 kg bengal gram dhal, 1 kg black gram dhal, 1 kg green gram dhal, 5 kg soy dhal, 2.5 kg fenugreek seeds, 0.75 kg pepper 0.5 kg cumin seeds and 0.15 kg cinnamon were mixed well, and to that 1 kg dry *Garcinia combogia* rinds was added and the blend was pulverized in a plate mill to the meal of the particle size of less than 350 micron. To the pulverized mixture, 0.05 kg asafoetida powder, 0.15 kg turmeric powder, 0.5 kg amla pulp powder, 2.5 kg skimmed milk powder, 1.25 kg table salt and 2 kg vegetable oil (saffola brand) were added and blended well.

To this, 1.0 kg of vitamins and minerals pre-mix, prepared by mixing 50,00,000 IU vitamin A (as acetate), 5,00,000 IU vitamin D (as cholecalciferol), 5.0 g vitamin $B_1$, (as thiamine mononitrate), 5 g vitamin $B_2$(riboflavin), 1.5 g vitamin $B_6$ (as pyridoxine hydrochloride) 7.5 mg vitamin $B_{12}$(cyanocobalamin), 50 g vitamin $B_3$(nicotinamide), 75 g vitamin C (ascorbic acid), 12.5 g vitamin E (as alpha tocopheryl acetate), 125 mg biotin and 8.15 g pantothenic acid (as calcium pantothenate), and 64.5 g calcium (as calcium phosphate), 30 g magnesium (as magnesium oxide), 16.0 g iron (as ferrous sulphate), 1.02 g manganese (as magnesium sulphate), 1.7 g copper (as copper sulphate), 1.1 g zinc (as zinc sulphate), 12.5 mg chromium (as picolinate) added to 1 kg of the blend and mixed well to form a homogenous matter was mixed with the food. The food thus prepared contained 14.5% protein, 7.5% fat, 60.7% available carbohydrates and 13.6% dietary fibre and 100 g of the food contained essential vitamins and minerals, sufficient to meet their daily requirements by the adults (Table 2). The food (ready-to-cook, RTC) was found suitable for preparation of various conventional products, such as chapathi, idli, upma, dosa and pongal. The texture and mouth feel of the products was comparable to that prepared from conventional ingredients and were acceptable by all sections of population including Type I and Type II diabetics. Residual bitterness was persistent, mainly contributed by the fenugreek content of the food.

EXAMPLE 3

Fifty kg each of wheat and millet based ready-to-cook formulations were prepared, as illustrated in examples 1 and 2, and the same were sprayed separately with a pre-determined amount of water to raise the moisture content to 18.0%, mixed well in a tumble mixer, equilibrated in closed container for about 24 hr and extrusion cooked in a single-screw extruder at 200 rpm and 140° C. barrel temperature at the feed rate of 100 kg/hr. The extrudates were cut at the exit point of the extruder mechanically to size similar to cheese roll and dried to 3% moisture level in a mechanical dryer. The expansion ratio, color, appearance, hardness and organoleptic qualities of the extruded material were assessed. The products with crisp texture and light brown color were readily accepted as ready-to-eat (RTE) food supplements, food adjuncts, snacks by diabetics and healthy population.

The color of the RTC and the RTE foods was measured in Hunterlab color measuring system where as the ratio of the diameter of the extruder orifice to the extrudates was recorded as expansion ratio. The hardness was measured in a food texturometer, solubility index and swelling power were determined following standard procedures. The foods pulverized to 45 mesh (BSS) were dispersed uniformly (10% w/v) in potable water and the cold paste viscosity measure in Brookfield viscometer, on the other hand, the same samples were heated to boiling, cooled to ambient temperature (30±2° C.) and the cooked paste viscosity was measured.

TABLE 2

Major nutrient contents and some of the functional properties of ready-to-cook and ready-to-eat hypoglycemic foods (g per 100 g)

| Foods and cereal base | Ready to cook | | Ready to eat | |
|---|---|---|---|---|
| Parameters | Wheat | Finger millet | Wheat | Finger miller |
| Available carbohydrates | 55.6 | 60.7 | 57.1 | 65.0 |
| Protein | 14.5 | 14.5 | 16.8 | 13.1 |
| Ether extractives | 7.9 | 7.5 | 3.8 | 3.3 |
| Dietary fiber | 18.2 | 13.6 | 18 | 16 |
| Solubility index | 39.3 | 5.5 | 4.5 | 12.8 |
| Swelling power | 645 | 581 | 626 | 533 |
| Hardness ($kg/cm^2$) | — | — | 60.9 | 54.4 |
| Cold paste viscosity cP | 22.0 | 26.0 | 71.0 | 209.0 |
| Cooked paste viscosity cP | 771.6 | 141.3 | 131.0 | 258.0 |
| Bulk density (g/ml) | 0.84 | 0.90 | 0.35 | 0.27 |
| Colour (DE) | 40.9 | 50.7 | 52.4 | 50.7 |

EXAMPLE 4

10 kg each of wheat and finger millet based ready-to-cook formulations prepared as illustrated in examples 1 and 2, were mixed separately with 5 L potable water and heated in a steam kettle to boiling with occasional stirring. The cooked slurry from wheat and millet based foods were homogenized separately in a colloidal mill. Nearly, half of the slurry from millet and wheat based formulations were dried separately over a twin drum roller drier (350 mm diameter and 600mm length; Esches wyrs, Rakens berg, FRG) working at 2 $kg/cm^2$ internal steam pressure and rotating at 4 rpm. The products collected as wafers were further dried in a mechanical drier at 60° C. and pulverized to flour in a Apex comminuting mill. Simultaneously, the other half of slurry from both millet and wheat based formulations were spray dried at 150° C. inlet temperature and 90° C. chamber temperature in a pilot scale spray dryer, the dried materials were collected in a controlled humidity chamber and stored in closed container.

The roller dried as well as spray dried foods on mixing with water and or milk formed paste of smooth consistency and were readily accepted by the healthy as well as diabetics including older infant and geriatrics.

EXAMPLE 5

In order to assess the blood glucose response or the hypoglycemic characteristics of the foods, glycemic indices of wheat and millet based ready-to-cook and ready-to-eat (extruded) foods were determined on normal healthy subjects in the age group of 25–50 yr. White bread from a reputed manufacturing company served as control as per the Internationally followed guidelines. The subjects after overnight fasting received the test foods equivalent to 50 g available carbohydrates, on two different days with a gap about 5 days. The fasting blood sugar and the changes in blood glucose at 15, 30, 45, 60, 90, 120, 150 min, after food intake were recorded by finger prick method using Accuttend glucose sensor (Roche Diagnostics Corporation, Indianapolis, Ind., USA), according to the Internationally accepted protocol (Wolever, T. M. S., Jenkins, D. J. A., The use of the glycemic index in predicting the blood glucose response to mixed meals, American Journal of Clinical Nutrition, vol. 43, 167–172, 1986). The glycemic index (GI) was calculated as follows and the GI values are presented in Table 3.

$$GI = \frac{\text{Incremental area under the glucose curve for the test meal}}{\text{Incremental area under the glucose curve for the standard glucose}}$$

Multiplied by 100 (one hundred)

TABLE 3

Glycemic indices of the wheat and millet based hypoglycemic foods

| | Wheat based foods | | Millet based foods | |
|---|---|---|---|---|
| | Ready-to-cook | Ready-to-eat | Ready-to-cook | Ready-to-eat |
| Food intake (g) (dwb) | 97.0 | 88.0 | 82.0 | 77.0 |
| Available carbohydrate contents | 51.6 | 57.0 | 60.7 | 65.0 |
| Form of consumption (recipe) | Thick porridge | As such | Thick porridge | As such |
| Glycemic index values | 64 | 64 | 78 | 76 |

Advantages

1. Judicious decortication of cereals detaches and enables to removes outer part of the seed coat without severally affecting its aluerone tissue, which is rich in soluble fiber, phytochemicals and other nutrients. In the process, the contaminants adhering to the cereals are removed, besides improving the sensory attributes of the finished products.
2. Mild toasting of the ingredients causes partial denaturation of the cereal proteins and also the starch thereby reducing the stickiness, which otherwise would impart slimy texture to the food products and affect the sensory attributes. Toasting also develops desirable aroma and improves the mouth feel. On the other hand, toasting the legumes and soy results in development of desirable aroma and reduction in the concentration of anti-nutrient factors such as trypsin and haemogglutanin inhibitor activities.
3. Blending of cereals, legumes, spice and condiments exert complementary and synergistic nutritional and health beneficial properties of the individual ingredients. While, the cereals provide complex carbohydrates, the legumes not only contribute to the protein content of the foods but also compliment the essential amino acids of cereals and improve the over all biological value of the food proteins. Blending of cereals, legumes, spice and condiments enhances the phytochemicals, micro-nutrients and dietary fibre content of the foods. Soy enriches the foods with proteins, polysaccharides and ω-6 fatty acids. Each of the spies, namely the turmeric imparts anti-microbial and anti-carcinogenic properties, the fenugreek imparts hypoglycemic characteristics through the galactomannas and also stimulates insulin secretion due to the presence of 4 hydroxy isoleucine, *Garcinia combogia* provides hydroxycitric acid that induces satiety, and the amla acts as insulin stimulant and also as source of thermostable vitamin C. Thus the spices exert synergistic health benefits besides improving the sensory attributes of the foods. Fortification of the foods with essential vitamins and minerals provides daily requirements of these protective nutrients to the consumer. In view of this, the food formulations not only provide wholesome nutrition but also help in regulating the blood glucose level and insulin response in Type II diabetics. Another advantage of the present invention is that, the ingredients are indigenously available in almost all part of the country and are generally low priced and could be processed at house-hold or community level to prepare ready-to-cook foods. This facilitates, preparation of various recipes from the food in the form and acceptable by the needy. On the other hand, the ready-to-eat food could be a convenient meal or meal replacer or snacks for the diabetics. Moreover, each one of the ingredients are being used as dietary components customarily and hence, safety of their consumption is well established. None of the ingredient undergo chemical treatment or such other means, which could induce toxicity or health hazardous components. Hence, the foods would be safe for consumption by all age groups.
4. The process permits alteration in the composition of the ingredients to suit the palate of different ethnic groups without largely affecting its hypoglycemic characteristics. Since, the food is of low calorie and high in fibre content, it could be useful for the obese also, both at National and International levels. While, the ready-to-cook formulations provide leverage to prepare different kinds of recipes at the consumer end, the blends could be subjected to secondary processing to prepared ready-to-eat convenience foods available to the diabetics at any time of the day including journey, as snack, supplement or wholesome food.
5. Since, the process is largely a dry process, the microbial contamination during processing could be minimum. While, the ready-to-cook food undergoes heat treatment during cooking, the ready-to-eat formulation becomes microbiologically safe during extrusion cooking, roller drying or spray drying.

6. The successful trial production, ready acceptability and low glycemic indices of the foods indicate the nutritional, technological and economic feasibility of process and their suitability as hypoglycemic foods. Since, processing cost will also be marginal, the foods may be available to the needy at affordable price in convenience form.

The invention claimed is:

1. A process for the preparation of a hypoglycemic food and/or formulation thereof of high textual and sensory quality, useful as a snack or as a wholesome or supplementary food, especially to Type II diabetics, said process comprising the steps of:
   a. spraying about 2–6% (volume/weight) water onto cereal,
   b. tempering or resting the sprayed cereal for a time duration ranging between 5–15 min,
   c. scouring or decorticating the tempered or rested cereal to about 2–4% degree of decortication,
   d. toasting the decorticated cereal optionally along with legumes, soy dhal, spice and condiments individually by contact heat at about 60–80° C. for a time duration ranging between 10–30 min to obtain a cereal with golden brown color,
   e. mixing the toasted cereal with one or more ingredients selected from the group consisting of legumes, soy dhal, spices, condiments, and fenugreek seeds to obtain a hypoglycemic blend,
   f. combining pulverized, dried *Garcinia combogia* rinds and the hypoglycemic blend into grits of about 350 microns or less particle size to obtain pulverized mixture,
   g. blending the pulverized mixture with skimined milk powder, vegetable oil, and amla powder to obtain a blended product,
   h. fortifying the blended product with a vitamin and mineral premix to obtain a fortified product, and
   i. homogenizing the fortified product with a conventional food material to obtain the hypoglycemic food and/or formulation thereof.

2. The process of claim 1 wherein the scouring of the cereal helps to separate the outermost layer of the seed coat.

3. The process of claim 1 wherein the toasting of the scoured cereal helps to develop aroma.

4. The process of claim 1 wherein the hypoglycemic food and/or formulation has a concentration of carbohydrates ranging between 50–60 %, a concentration of protein ranging between 12–17%, a concentration of lipids ranging between 4–9%, and a concentration of dietary fiber, vitamins, and minerals ranging between 12–20%.

5. The process of claim 1 whereby the hypoglycemic food is further processed into a ready to cook formulation.

6. The process of claim 1 wherein the concentration of toasted cereal is between 50–60%, the concentration of toasted legumes is between 6–12%, the concentration of soy is between 7–15%, the concentration of fenugreek is between 2–6%, the concentration of spices is between 3–7%, the concentration of amla is between 0.5–2%, the concentration of *Garcinia combogia* rinds is between 1.5 to 3%, the concentration of dry skimined milk powder is between 3–6%, the concentration of vegetable oil is between 2–6%, and the concentration of vitamin and mineral premix is between 1–3%.

7. The process of claim 1 wherein the hypoglycemic food and/or formulation retains its hypoglycemic characteristics when consumed with normal food adjuncts.

8. The process of claim 1 whereby the hypoglycemic food is further processed into a ready to eat formulation, wherein the ready-to-eat formulation is prepared in the form of grits, flakes, rolls, or sticks.

9. The process of claim 1 wherein the cereal is decorticated using a cereal scourer, rice huller, or grain pearler.

10. The process of claim 1 wherein the toasting is performed in a grain roaster, a hot air cereal dryer, or any other food toasting equipment or machinery including an IR heater.

11. The process of claim 1 wherein 100 g of the food contains 1–3g of the premix and meets 100% of the recominended dietary allowance requirements.

12. The process of claim 1 wherein the pulverizing is performed in a hammer mill or other type of cereal mill.

13. The process of claim 1 wherein the vitamin and mineral premix comprises pharmaceutical grade vitamins A, D, B1, B2, B6, B12, B6, C, E, and minerals comprising chromium, selenium, zinc, biotin, pantothenenic, calcium, magnesium, iron, manganese, and copper.

14. The process of claim 1 whereby the hypoglycemic food is further processed into a ready to cook formulation, wherein the ready-to-cook formulation is equilibrated to 14–20% moisture level, and extruded in a single or twin screw extrusion cooker maintained at 150–200 rpm and 120–150° C. temperature or alternatively the ready-to-cook formulation is mixed with potable water with 10–15% (w/v) solid contents, heated to boiling, homogenized and roller dried or spray dried.

15. The process of claim 1 whereby the hypoglycemic food is further processed into a ready to cook and a ready to eat formulation which exhibits a moderate blood glucose response of 55–75 glycemic index (GI) values against white bread as a standard with a GI value of 100.

* * * * *